United States Patent
Hanamoto

(10) Patent No.: US 10,706,370 B2
(45) Date of Patent: Jul. 7, 2020

(54) DEVICE AND METHOD FOR MANAGING A PLURALITY OF DOCUMENTS

(71) Applicant: FUJITSU LIMITED, Kawasaki-shi, Kanagawa (JP)

(72) Inventor: Kazuhisa Hanamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 358 days.

(21) Appl. No.: 15/209,204

(22) Filed: Jul. 13, 2016

(65) Prior Publication Data
US 2016/0321251 A1    Nov. 3, 2016

Related U.S. Application Data

(63) Continuation of application No. PCT/JP2014/053520, filed on Feb. 14, 2014.

(51) Int. Cl.
*G06Q 10/06* (2012.01)
*G06Q 10/10* (2012.01)
(Continued)

(52) U.S. Cl.
CPC ............ *G06Q 10/06* (2013.01); *G06F 16/93* (2019.01); *G06F 40/134* (2020.01); *G06Q 10/103* (2013.01)

(58) Field of Classification Search
CPC .......................... G06Q 10/103; G06Q 10/06
See application file for complete search history.

(56) References Cited

U.S. PATENT DOCUMENTS 5,864,480 A * 1/1999 Ladd ............... G06Q 99/00
                                             700/103
6,601,017 B1 * 7/2003 Kennedy .......... G06F 11/3684
                                             702/182
(Continued)

FOREIGN PATENT DOCUMENTS

CN    103530395 B  *  7/2018
JP       3-46059         2/1991
(Continued)

OTHER PUBLICATIONS

Noritoshi Atsumi et al. "A Study on a Development Environment for Software Traceability Management", IPSJ SIG Notes 2012 (Heisei 24) Nendo 1 [CD- ROM], Embedded Systems (EMB), No. 25, 2012, pp. 5-6.
(Continued)

*Primary Examiner* — Scott T Baderman
*Assistant Examiner* — Benjamin Smith
(74) *Attorney, Agent, or Firm* — Staas & Halsey LLP

(57) ABSTRACT

A document management method by using a computer includes: specifying, among a plurality of documents that belong to a most upstream development process, a document with which association indicating that the document has influence on a document that belongs to a downstream development process is not performed; specifying, among a plurality of documents that belong to a most downstream development process, a document with which association indicating that the document receives influence from a document that belongs to an upstream development process is not performed; and specifying, among a plurality of documents that belong to an intermediate development process, a document with which the association indicating that the document has influence on a document that belongs to the downstream development process or the association indicating that the document receives influence from a
(Continued)

document that belongs to the upstream development process is not performed.

5 Claims, 8 Drawing Sheets

(51) Int. Cl.
*G06F 16/93* (2019.01)
*G06F 40/134* (2020.01)

(56) References Cited

U.S. PATENT DOCUMENTS

| | | | | |
|---|---|---|---|---|
| 6,629,096 B1* | 9/2003 | Reddy | G06N 5/022 | 707/603 |
| 6,892,376 B2 | 5/2005 | McDonald | G06Q 10/103 | 707/E17.005 |
| 6,959,438 B2* | 10/2005 | Miller | G06F 8/00 | 719/321 |
| 7,051,036 B2* | 5/2006 | Rosnow | G06Q 10/06 | 707/723 |
| 7,130,807 B1* | 10/2006 | Mikurak | G06Q 10/06 | 705/7.25 |
| 7,159,206 B1* | 1/2007 | Sadhu | G06Q 10/06 | 717/101 |
| 7,290,205 B2* | 10/2007 | Moncsko | G06F 16/9558 | 715/208 |
| 7,337,124 B2* | 2/2008 | Corral | G06Q 10/06 | 705/7.17 |
| 7,469,219 B2* | 12/2008 | Goldberg | G06Q 10/06311 | 705/7.13 |
| 7,529,695 B2* | 5/2009 | Yang | G06Q 10/06 | 705/28 |
| 7,730,114 B2* | 6/2010 | Bybee | G06F 16/13 | 707/825 |
| 7,778,866 B2* | 8/2010 | Hughes | G06F 8/20 | 705/7.42 |
| 7,810,067 B2* | 10/2010 | Kaelicke | G06Q 10/10 | 717/102 |
| 7,937,281 B2* | 5/2011 | Miller | G06Q 10/06 | 705/7.12 |
| 7,958,094 B2* | 6/2011 | Grack | G06F 16/93 | 707/662 |
| 8,103,621 B2* | 1/2012 | Brixius | G06F 16/185 | 707/609 |
| 8,122,425 B2* | 2/2012 | Corral | G06Q 10/06 | 717/101 |
| 8,135,753 B2* | 3/2012 | Zhao | G06F 16/24556 | 707/797 |
| 8,150,799 B2* | 4/2012 | Anno | G06Q 10/06311 | 707/608 |
| 8,170,989 B2* | 5/2012 | Bildhaeuser | G06Q 10/107 | 707/638 |
| 8,412,813 B2* | 4/2013 | Carlson | G06F 8/36 | 707/610 |
| 8,429,527 B1* | 4/2013 | Arbogast | G06Q 10/0633 | 715/255 |
| 8,527,328 B2* | 9/2013 | Grace | G06Q 30/0202 | 705/7.39 |
| 8,671,280 B2* | 3/2014 | Yoshioka | G06Q 10/10 | 705/35 |
| 8,706,535 B2* | 4/2014 | Seybold | G06Q 10/06316 | 705/7.13 |
| 8,751,275 B2* | 6/2014 | Ramdattan | G06Q 10/06 | 705/7.12 |
| 9,015,115 B2* | 4/2015 | Diehl | G06Q 10/06 | 707/613 |
| 9,047,575 B2* | 6/2015 | Ioannou | G06Q 10/063114 | |
| 9,176,951 B2* | 11/2015 | Patrudu | G06F 40/40 | |
| 9,256,850 B2* | 2/2016 | Harley | G06F 8/65 | |
| 9,354,922 B2* | 5/2016 | Lee | G06F 16/164 | |
| 9,542,160 B2* | 1/2017 | Novak | G06F 8/20 | |
| 9,811,604 B2* | 11/2017 | Gleicher | G06F 16/80 | |
| 9,965,505 B2* | 5/2018 | Avati | G06F 16/2358 | |
| 2002/0099732 A1* | 7/2002 | Miller | G06F 8/00 | 715/201 |
| 2003/0061081 A1* | 3/2003 | Kellond | G06Q 10/06 | 705/7.12 |
| 2003/0074247 A1* | 4/2003 | Dick | G06Q 10/06 | 705/7.15 |
| 2003/0106039 A1* | 6/2003 | Rosnow | G06Q 10/06 | 717/100 |
| 2003/0126050 A1* | 7/2003 | Theiss | G06F 8/20 | 705/35 |
| 2003/0188290 A1* | 10/2003 | Corral | G06Q 10/06 | 717/101 |
| 2003/0233289 A1* | 12/2003 | Yang | G06Q 10/06 | 705/28 |
| 2003/0233290 A1* | 12/2003 | Yang | G06Q 10/06 | 705/28 |
| 2004/0143811 A1* | 7/2004 | Kaelicke | G06F 8/20 | 717/101 |
| 2004/0225658 A1* | 11/2004 | Horber | G06F 16/93 | |
| 2005/0108631 A1* | 5/2005 | Amorin | G06Q 10/00 | 715/234 |
| 2005/0160395 A1* | 7/2005 | Hughes | G06F 8/20 | 717/102 |
| 2005/0204331 A1* | 9/2005 | Miller | G06F 8/00 | 717/101 |
| 2005/0283410 A1* | 12/2005 | Gosko | G06Q 30/06 | 705/26.44 |
| 2005/0289013 A1* | 12/2005 | Goldberg | G06Q 10/06311 | 705/7.13 |
| 2005/0289446 A1* | 12/2005 | Moncsko | G06F 16/9558 | 715/208 |
| 2006/0026595 A1* | 2/2006 | Nakayama | G06F 8/71 | 718/100 |
| 2006/0178918 A1* | 8/2006 | Mikurak | G06Q 10/06 | 705/7.25 |
| 2006/0190391 A1* | 8/2006 | Cullen, III | G06Q 10/10 | 705/37 |
| 2006/0235732 A1* | 10/2006 | Miller | G06Q 10/06 | 705/7.23 |
| 2007/0067125 A1* | 3/2007 | Guivarch | G06Q 10/08 | 702/84 |
| 2007/0067196 A1* | 3/2007 | Usui | G06Q 10/06 | 705/7.12 |
| 2007/0088958 A1* | 4/2007 | Qa'Im-maqami | G06Q 10/10 | 713/176 |
| 2008/0091693 A1* | 4/2008 | Murthy | G06F 16/94 | |
| 2008/0148137 A1* | 6/2008 | Terao | G06F 16/93 | 715/200 |
| 2008/0162944 A1* | 7/2008 | Suzuki | G06F 21/6272 | 713/185 |
| 2008/0228739 A1* | 9/2008 | Motoyama | G06Q 10/06 | |
| 2009/0024668 A1* | 1/2009 | Bildhaeuser | G06Q 10/107 | |
| 2009/0055228 A1* | 2/2009 | Henry | G06Q 10/063118 | 705/7.17 |
| 2009/0055237 A1* | 2/2009 | Henry | G06Q 10/06 | 705/7.16 |
| 2009/0077462 A1* | 3/2009 | Kano | G06F 40/154 | 715/234 |
| 2009/0132814 A1* | 5/2009 | Yoshioka | G06Q 10/10 | 713/161 |
| 2009/0144694 A1* | 6/2009 | Lin | G06Q 10/06 | 717/102 |
| 2009/0161152 A1* | 6/2009 | Mori | G06F 16/93 | 358/1.15 |
| 2009/0307195 A1* | 12/2009 | Anno | G06Q 10/06311 | |
| 2009/0327262 A1* | 12/2009 | Grack | G06F 16/93 | |
| 2010/0088271 A1* | 4/2010 | Brixius | G06F 16/185 | 707/609 |
| 2010/0192077 A1* | 7/2010 | Mochko | G06Q 10/06 | 715/764 |
| 2010/0242022 A1* | 9/2010 | Wagner | G06F 8/71 | 717/123 |
| 2010/0274789 A1* | 10/2010 | Grace | G06Q 10/06 | 707/748 |

(56) References Cited

U.S. PATENT DOCUMENTS

| | | | | |
|---|---|---|---|---|
| 2010/0280883 A1* | 11/2010 | Ioannou | G06Q 10/06 | 705/7.15 |
| 2011/0010214 A1* | 1/2011 | Carruth | G06Q 10/06 | 705/7.26 |
| 2011/0029489 A1* | 2/2011 | Zhao | G06F 16/24556 | 707/648 |
| 2011/0119194 A1* | 5/2011 | McLees | G06Q 10/00 | 705/301 |
| 2011/0119195 A1* | 5/2011 | McLees | G06Q 10/06 | 705/301 |
| 2011/0131178 A1* | 6/2011 | Kanellos | G06F 16/83 | 707/609 |
| 2011/0184771 A1* | 7/2011 | Wells | G06Q 10/04 | 705/7.14 |
| 2011/0258605 A1* | 10/2011 | Ioannou | G06F 8/77 | 717/126 |
| 2011/0296291 A1* | 12/2011 | Melkinov | G06F 40/131 | 715/229 |
| 2012/0035974 A1* | 2/2012 | Seybold | G06Q 10/06 | 705/7.26 |
| 2012/0110544 A1* | 5/2012 | Novak | G06F 8/20 | 717/101 |
| 2013/0163037 A1* | 6/2013 | Huster | G06F 3/1205 | 358/1.15 |
| 2013/0268258 A1* | 10/2013 | Patrudu | G06F 40/40 | 704/2 |
| 2013/0290053 A1* | 10/2013 | Zumwalt | G06Q 10/06 | 705/7.15 |
| 2013/0290250 A1* | 10/2013 | Diehl | G06F 7/00 | 707/613 |
| 2013/0297517 A1* | 11/2013 | Sinha | G06Q 10/06 | 705/301 |
| 2014/0143765 A1* | 5/2014 | Harley | G06Q 10/067 | 717/168 |
| 2014/0180754 A1* | 6/2014 | Arbogast | G06Q 10/06 | 705/7.27 |
| 2014/0200932 A1* | 7/2014 | Daouk | G06Q 10/02 | 705/5 |
| 2014/0310047 A1* | 10/2014 | De | G06Q 10/103 | 705/7.21 |
| 2014/0324496 A1* | 10/2014 | Jun | G06Q 10/063112 | 705/7.14 |
| 2015/0066563 A1* | 3/2015 | McLees | G06Q 10/00 | 705/7.23 |
| 2015/0088578 A1* | 3/2015 | Nowakowski | G06Q 10/06313 | 705/7.23 |
| 2015/0212776 A1* | 7/2015 | Huster | G06F 3/1205 | 358/1.14 |
| 2015/0286495 A1* | 10/2015 | Lee | G06F 16/164 | 718/102 |
| 2016/0072750 A1* | 3/2016 | Kass | H04L 51/14 | 709/206 |
| 2016/0259819 A1* | 9/2016 | Smith | G06F 16/2228 | |
| 2016/0321251 A1* | 11/2016 | Hanamoto | G06F 40/134 | |
| 2017/0124988 A1* | 5/2017 | Mitsui | G09G 5/34 | |

FOREIGN PATENT DOCUMENTS

| | | |
|---|---|---|
| JP | 8-292884 | 11/1996 |
| JP | 2002-182908 | 6/2002 |
| JP | 2008-123251 | 5/2008 |
| JP | 2008-192059 | 8/2008 |
| JP | 2011-253345 | 12/2011 |
| JP | 2012-103884 | 5/2012 |

OTHER PUBLICATIONS

Yutaka Fujita et al., "Diagnostic Method for Embedded Software Development Documents", IPSJ SIG Notes (Heisei 21) Nendo 6 [DVD-ROM], Embedded Systems (EMB), No. 16, 2010, p. 8.
International Search Report dated Apr. 8, 2014 in corresponding International Application No. PCT/JP2014/053520.

* cited by examiner

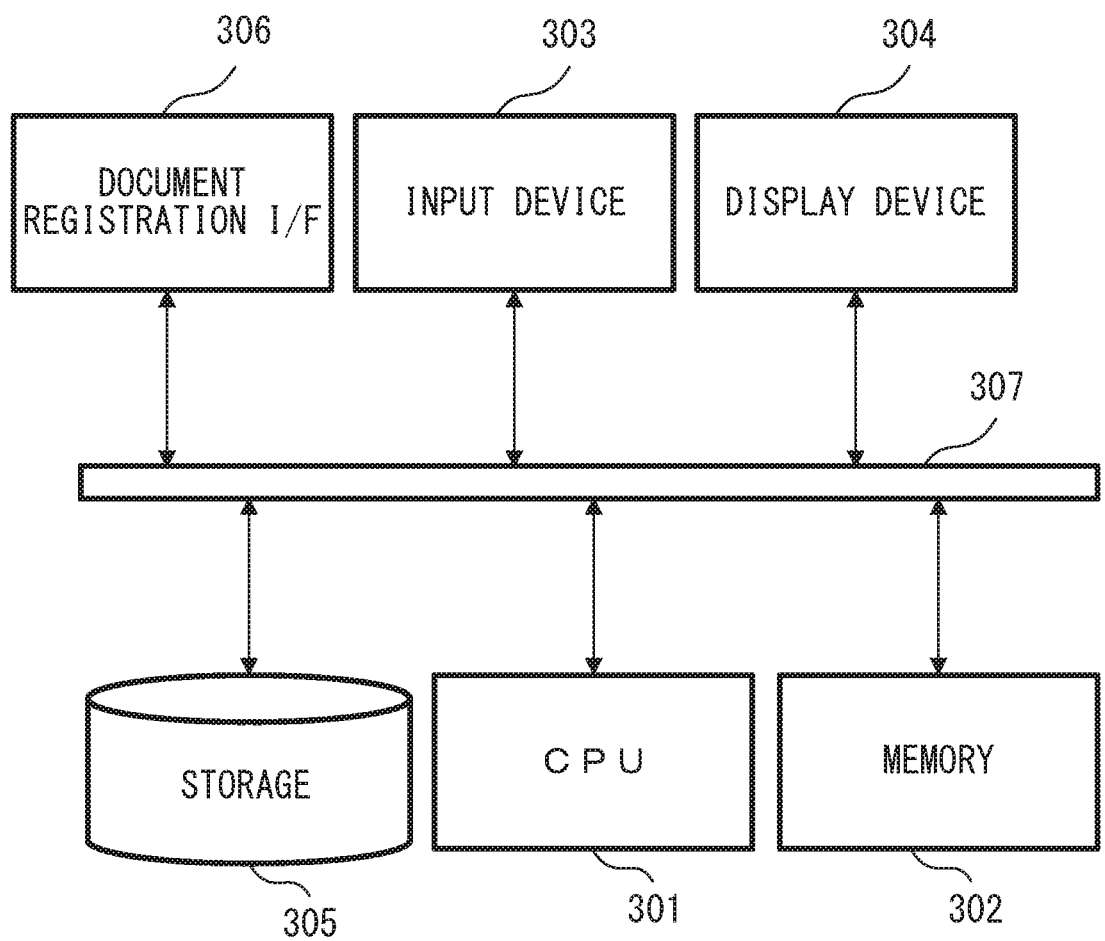
F I G. 3

DOCUMENT MANAGEMENT TABLE

| ID | DOCUMENT NAME | REGISTRATION PROCESS |
|---|---|---|
| ID 0001 | FUNCTIONAL REQUIREMENT DOCUMENT A | FUNCTIONAL REQUIREMENT |
| ID 0002 | FUNCTIONAL REQUIREMENT DOCUMENT B | FUNCTIONAL REQUIREMENT |
| ID 0003 | FUNCTIONAL REQUIREMENT DOCUMENT C | FUNCTIONAL REQUIREMENT |
| ID 0004 | FUNCTION DESIGN DOCUMENT A1 | FUNCTION DESIGN |
| ID 0005 | FUNCTION DESIGN DOCUMENT A2 | FUNCTION DESIGN |
| ID 0006 | FUNCTION DESIGN DOCUMENT B | FUNCTION DESIGN |
| ID 0007 | FUNCTION DESIGN DOCUMENT C | FUNCTION DESIGN |
| ID 0008 | DETAILED DESIGN DOCUMENT A1 | DETAILED DESIGN |
| ID 0009 | DETAILED DESIGN DOCUMENT A2 | DETAILED DESIGN |
| ID 0010 | DETAILED DESIGN DOCUMENT B | DETAILED DESIGN |
| ID 0011 | DETAILED DESIGN DOCUMENT C1 | DETAILED DESIGN |
| ID 0012 | DETAILED DESIGN DOCUMENT C2 | DETAILED DESIGN |

F I G. 4 A

RELATION MANAGEMENT TABLE

| MASTER DOCUMENT | SLAVE DOCUMENT |
|---|---|
| ID 0001 | ID 0004 |
| ID 0002 | ID 0006 |
| ID 0003 | ID 0007 |
| ID 0004 | ID 0008 |
| ID 0005 | ID 0009 |
| ID 0007 | ID 0011 |
| ID 0007 | ID 0012 |

F I G. 4 B

| Error |
|---|
| ASSOCIATION BETWEEN FOLLOWING DOCUMENTS IS DEFINED INSUFFICIENTLY.<br><br>· INPUT DOCUMENT OF FUNCTION DESIGN DOCUMENT A2<br>· OUTPUT DOCUMENT OF FUNCTION DESIGN DOCUMENT B |

| FUNCTIONAL REQUIREMENT | FUNCTION DESIGN | DETAILED DESIGN | DEVELOPMENT | TEST |
|---|---|---|---|---|
| ////// | FUNCTION DESIGN DOCUMENT A2 | DETAILED DESIGN DOCUMENT A2 | DEVELOPMENT DOCUMENT A2-1 | TEST SPECIFICATION A2-1 |
| | | | DEVELOPMENT DOCUMENT A2-2 | TEST SPECIFICATION A2-1 |
| | | | DEVELOPMENT DOCUMENT A2-2 | TEST SPECIFICATION A2-2 |

CHECK RESULT

OUTPUT ACCORDING TO FUNCTION REQUIREMENT HAS NOT BEEN REGISTERED.

DEVICE AND METHOD FOR MANAGING A PLURALITY OF DOCUMENTS

CROSS-REFERENCE TO RELATED APPLICATION

This application is a continuation application of International Application PCT/JP2014/053520 filed on Feb. 14, 2014 and designated the U.S., the entire contents of which are incorporated herein by reference.

FIELD

The embodiments discussed herein are related to a device and a method for managing a relationship between a plurality of documents.

BACKGROUND

As an example, in a product development process, a plurality of documents such as design documents are generated. As an example, design documents are collectively stored in a storage unit in each development process.

Further, traceability among the development processes is important. In order to secure traceability, an operator performs an operation to correlate the respective design documents among the development processes.

As a related technology, a method for securing traceability of documents in development processes has been proposed (for example, Japanese Laid-open Patent Publication No. 2002-182908).

SUMMARY

According to an aspect of the embodiments, a document management method by using a computer includes: referencing a storage apparatus that stores a plurality of documents in each of a plurality of development processes; specifying, among a plurality of documents, each of which belongs to a most upstream development process in the plurality of development processes, a document with which association indicating that the document has influence on a document that belongs to a downstream development process is not performed; specifying, among a plurality of documents, each of which belongs to a most downstream development process in the plurality of development processes, a document with which association indicating that the document receives influence from a document that belongs to an upstream development process is not performed; specifying, among a plurality of documents, each of which belongs to a development process that is neither the most upstream development process nor the most downstream development process in the plurality of development processes, a document with which the association indicating that the document has influence on a document that belongs to the downstream development process or the association indicating that the document receives influence from a document that belongs to the upstream development process is not performed; and outputting information relating to the specified document.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a hardware configuration of a computer implemented with a document management device.

FIG. 4A illustrates an example of a document management table.

FIG. 4B illustrates an example of a relationship management table.

FIG. 6 illustrates an example of not-yet-associated document information output according to the method illustrated in FIG. 5.

FIG. 8 illustrates an example of not-yet-associated document information output according to the method illustrated in FIG. 7.

DESCRIPTION OF EMBODIMENTS

According to the conventional method, when there are a large number of documents, not all of the documents may be associated appropriately with each other. When the documents are not associated appropriately with each other, it is difficult to trace the documents. As an example, assume that a user X manages a document X, and that a user Y manages a document Y. Also assume that, when the content of the document X is changed, the content of the document Y is needed to be changed. Further assume that the documents X and Y are not associated appropriately with each other. In this case, when the user X changes the content of the document X, the user Y may fail to recognize a change in the document X. Accordingly, when the document X is changed, the document Y may fail to be changed.

Figure 1:
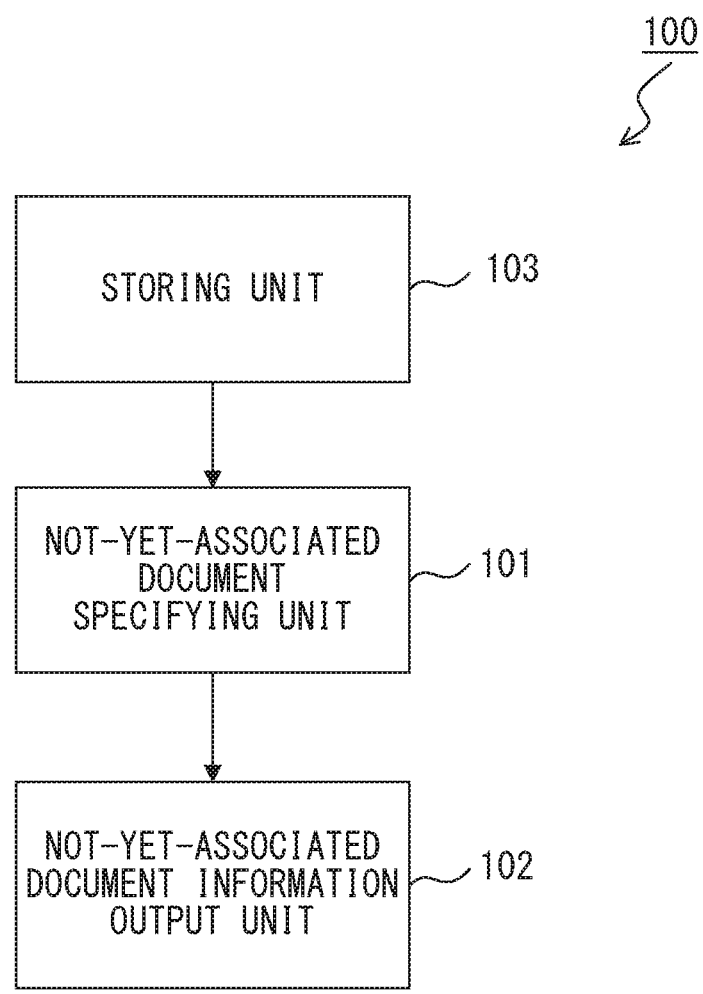
FIG. 1 is a block diagram of a document management device according to the embodiments.

FIG. 1 is a block diagram of a document management device according to the embodiments. A document management device 100 includes a not-yet-associated document specifying unit 101, a not-yet-associated document information output unit 102, and a storing unit 103.

The not-yet-associated document specifying unit 101 references the storing unit 103 in which a plurality of documents have been stored for each development process, and in the case of a document that belongs to the most upstream development process, the not-yet-associated document specifying unit 101 specifies a document that has not been associated in such a way that the document has influence on a document that belongs to a downstream development process. In the case of a document that belongs to the most downstream development process, the not-yet-associated document specifying unit 101 specifies a document that has not been associated in such a way that the document receives influence from a document that belongs to an upstream development document. Alternatively, in the case of a document that belongs to a development process that is neither the most upstream development process nor the most downstream development process, the not-yet-associated document specifying unit 101 specifies a document that has not been associated in such a way that the document has influence on a document that belongs to a downstream development process or in such a way that the document receives influence from a document that belongs to an upstream development process.

The not-yet-associated document information output unit 102 outputs information relating to the document specified by the not-yet-associated document specifying unit 101.

Figure 2:
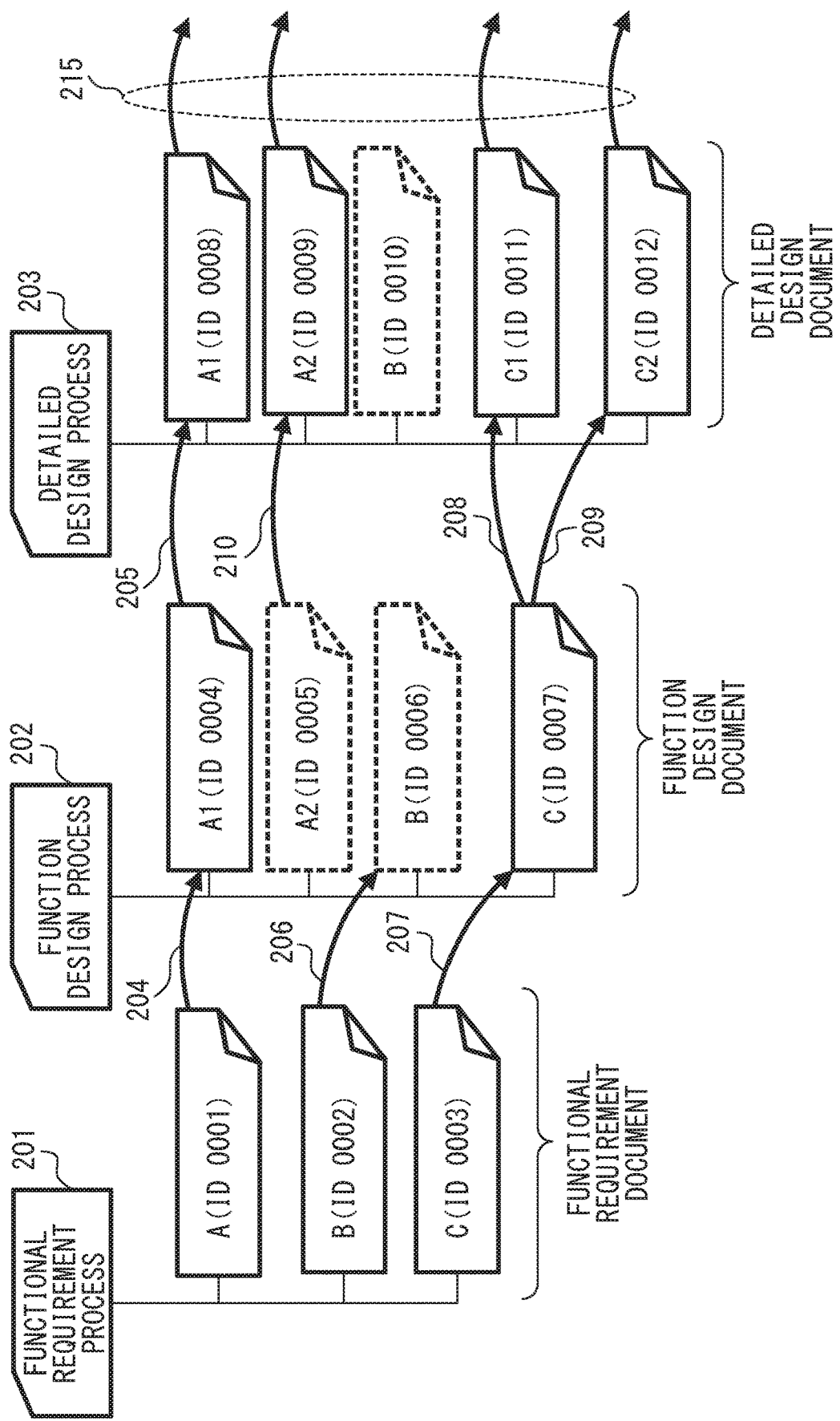
FIG. 2 illustrates an example of an operation of a document management device.

FIG. 2 illustrates an example of an operation of the document management device 100. The document management device 100 manages a plurality of documents for respective development processes (a functional requirement process 201, a function design process 202, and a detailed design process 203).

As an example, for the functional requirement process 201, functional requirement documents A, B, C, and the like are managed that describe a requirement definition relating to a developed product (including a hardware product and a software product). For the function design process 202, function design documents A1, A2, B, C, and the like are managed that describe function design (or external design) relating a developed product in accordance with the functional requirement documents described in the functional requirement process 201. For the detailed design process 203, detailed design documents A1, A2, B, C1, C2, and the like are managed that describe detailed designs relating to a developed product in accordance with the functional design documents described in the function design process 202.

In this example, the functional requirement document A is generated in the functional requirement process 201, and the function design document A1 is subsequently generated according to the functional requirement document A in the function design process 202. Further, the detailed design document A1 is generated according to the function design document A1 in the detailed design process 203. In this case, a user of the function design document A1 issues an instruction to perform association indicating that the function design document A1 has been generated according to the functional requirement document A. In response to this instruction, a relationship 204 is established between the functional requirement document A and the function design document A1. The "relationship" refers to a state in which one document has influence on another document (or one document receives influence from another document). Further, a user of the detailed design document A1 issues an instruction to perform association indicating that the detailed design document A1 has been generated according to the function design document A1. In response to this instruction, a relationship 205 is established between the function design document A1 and the detailed design document A1.

Similarly, the functional requirement document B is generated in the functional requirement process 201, and the function design document B is subsequently generated according to the functional requirement document B in the function design process 202. In this case, a user of the function design document B issues an instruction to perform association indicating that the function design document B has been generated according to the functional requirement document B. In response to this instruction, a relationship 206 is established between the functional requirement document B and the function design document B.

Further, the functional requirement document C is generated in the functional requirement process 201, and the function design document C is subsequently generated according to the functional requirement document C in the function design process 202. The detailed design documents C1 and C2 are subsequently generated according to the function design document C in the detailed design process 203. In this case, a user of the function design document C issues an instruction to perform association indicating that the function design document C has been generated according to the functional requirement document C. In response to this instruction, a relationship 207 is established between the functional requirement document C and the function design document C. Further, respective users of the detailed design documents C1 and C2 issue instructions indicating that the detailed design documents C1 and C2 have been generated according to the function design document C. In response to these instructions, relationships 208 and 209 are respectively established between the function design document C and the detailed design document C1 and between the function design document C and the detailed design document C2.

The instructions above to perform association are manually issued, for example, by respective users. Alternatively, when an instruction to generate a new function design document according to a functional requirement document is issued, or when an instruction to generate a new detailed design document according to a function design document is issued, a relationship may be automatically established.

As described above, in this example, the function design process 202 is performed after the functional requirement process 201, and the detailed design process 203 is performed after the function design process 202. In this case, the functional requirement process 201 is defined to be a development process on an upstream side of the function design process 202, and the function design process 202 is defined to be a development process on a downstream side of the functional requirement process 201. Similarly, the function design process 202 is defined to be a development process on an upstream side of the detailed design process 203, and the detailed design process 203 is defined to be a development process on a downstream side of the function design process 202.

As illustrated in FIG. 2, for respective detailed design documents that belong to the detailed design process 203, a relationship 215 may be established with documents that belong to a development process on a more downstream side of the detailed design process 203.

In the example illustrated in FIG. 2, a user of the function design process 202 generates the function design document A2 according to the functional requirement document A. Assume here that the user forgets to issue an instruction to perform association indicating that the function design document A2 has been generated according to the functional requirement document A, or that the user does not issue the instruction intentionally. In this case, a relationship is not established between the functional requirement document A and the function design document A2. Alternatively, assume that means for automatically performing association is used, but that the generation of the function design document A2 is not invoked directly from the functional requirement document A and the function design document A2 is independently generated such that a relationship is not established between the functional requirement document A and the function design document A2. However, assume that, after the detailed design document A2 is generated according to the function design document A2, a user of the detailed design process 203 issues an instruction to perform association indicating that the detailed design document A2 has been generated according to the function design document A2. In response to this instruction, a relationship 210 is established between the function design document A2 and the detailed design document A2.

Similarly, assume that a user of the detailed design process 203 generates the detailed design document B according to the function design document B, but that the user does not issue an instruction to perform association indicating that the detailed design document B has been generated according to the function design document B. In this case, a relationship is not established between the function design document B and the detailed design document B.

As described above, relationships with the function design document A2, the function design document B, and the detailed design document B are incompletely established.

Here, as an example, consider a case in which the functional requirement document A is revised in a specification or the like in the stage of development. In this case, according to the relationship 204 that has been established between the functional requirement document A and the function design document A1, the function design document A1 can be invoked, and design can be changed accordance to a change in the specification of the functional requirement document A. However, a relationship has not been established between the functional requirement document A and the function design document A2. Consequently, the functional requirement document A2 may fail to be invoked, and design may fail to be changed according to the change in the specification of the functional requirement document A such that the omission of design may occur.

Similarly, as another example, consider a case in which the function design document B is revised in design or the like. In this case, a relationship has not been established between the function design document B and the detailed design document B, and therefore the detailed design document B may fail to be invoked, and design may fail to be changed according to a change in the specification of the function design document B such that the omission of design may occur.

FIG. 2 illustrates a simple example in which the number of documents is small. However, as an example, in the development process of automobiles, the number of documents registered in respective stages of the development process is huge. Consequently, a document with which a relationship has not been established may be embedded into a huge number of documents, traceability may fail to be secured, and development may be significantly interfered with.

Accordingly, the document management device 100 illustrated in FIG. 1 performs the operation described below so as to specify a document with which a relationship has been incompletely established (hereinafter referred to as a "not-yet-associated document") and to output and display information relating to the not-yet-associated document. Assume that a user can specify a development process in which the establishment of a relationship is to be confirmed.

Assume, for example, that a user issues an instruction to confirm a relationship in the functional requirement process 201 in FIG. 2. The not-yet-associated document specifying unit 101 specifies a document with which association indicating that the document has influence on the function design document A1, A2, B, or C that belongs to the function design process 202 on a downstream side of the functional requirement process 201 has not been performed, from among the respective functional requirement documents A, B, and C that belong to the functional requirement process 201. This specifying operation is performed by confirming whether the respective functional requirement documents A, B, and C have a relationship in a downstream direction (hereinafter referred to as an "Egress relationship"). As a result, the not-yet-associated document specifying unit 101 confirms that all of the functional requirement documents have the Egress relationship. In this case, the not-yet-associated document information output unit 102 does not need to output an examination result.

Assume that a user issues an instruction to confirm a relationship in the function design process 202. The not-yet-associated document specifying unit 101 specifies a document with which association indicating that the document receives influence from the functional requirement document A, B, or C that belongs to the functional requirement process 201 on an upstream side of the function design process 202 has not been performed, from among the respective function design documents A1, A2, B, and C that belong to the function design process 202. The not-yet-associated document specifying unit 101 also specifies a document with which association indicating that the document has influence on the detailed design document A1, A2, B, C1, or C2 that belongs to the detailed design process 203 on a downstream side has not been performed, from among the respective function design documents A1, A2, B, and C. This specifying operation is performed by confirming whether the respective function design documents A1, A2, B, and C have a relationship from an upstream side (hereinafter referred to as an "Ingress relationship") and an Egress relationship. As a result, the not-yet-associated document specifying unit 101 specifies that the function design document A2 does not have any Ingress relationships and that the function design document B does not have any Egress relationships. In this case, the not-yet-associated document information output unit 102 outputs information indicating that respective relationships with the function design documents A2 and B are omitted.

Further, assume that a user issues an instruction to confirm a relationship in the detailed design process 203. The not-yet-associated document specifying unit 101 specifies a document with which association indicating that the document receives influence from the function design documents A1, A2, B, or C that belongs to the upstream functional requirement process 201 has not been performed, from among the respective detailed design documents A1, A2, B, C1, and C2 that belong to the detailed design process 203. As a result, the not-yet-associated document specifying unit 101 specifies that the detailed design document B does not have the Ingress relationship. In this case, the not-yet-associated document information output unit 102 outputs information indicating that a relationship with the detailed design document B has been omitted.

Separately from the method above for specifying a not-yet associated document, a user can directly specify a document with which a relationship is to be confirmed.

Assume, for example, that a user specifies the functional requirement document B in FIG. 2. In this case, no processes exist on an upstream side of the functional requirement process 201 that the functional requirement document B belongs to, and therefore the not-yet-associated document specifying unit 101 retrieves a document with which association indicating that the document has influence on a downstream development process has been performed, in order from the specified functional requirement document B. This retrieval is performed by tracing Egress relationships in order from the functional requirement document B. First, the Egress relationship 206 established with functional requirement document B is referenced, and the function design document B is specified. Then, whether an Egress relationship has been established with the function design document B is checked, but it is found that no Egress relationships have been established with the function design document B. By doing this, the not-yet-associated document specifying unit 101 specifies that no Egress relationships have been established with the function design document B. The not-yet-associated document information output unit 102 outputs information indicating that no Egress relationships have been established with the function design document B.

Assume that a user specifies the detailed design document A2. In this case, no processes exist on a downstream side of the detailed design process 203 that the detailed design document A2 belongs to. Accordingly, the not-yet-associated document specifying unit 101 retrieves a document with which association indicating that the document receives influence from an upstream development process has been performed, in order from the specified detailed design document A2. This retrieval is performed by tracing Ingress relationships in order from the detailed design document A2. First, the Ingress relationship 210 established with the detailed design document A2 is referenced, and the function design document A2 is specified. Then, whether an Ingress relationship has been established with the function design document A2 is checked, but it is found that no Ingress relationships have been established with the function design document A2. By doing this, the not-yet-associated document specifying unit 101 specifies that no Ingress relationships have been established with the function design document A2. The not-yet-associated document information output unit 102 outputs information indicating that no Ingress relationships have been established with the function design document A2.

The description above corresponds to a case in which a document with which a relationship has been confirmed belongs to the functional requirement process 201 that is the most upstream development process, or the detailed design process 203 that is the most downstream development process. Even when a document with which a relationship has been confirmed belongs to an intermediate development process (for example, the function design process 202), a not-yet-associated document can be specified by sequentially retrieving an Ingress relationship and an Egress relationship respectively on the upstream side and the downstream side.

As described above, according to the embodiments, an instruction to confirm a relationship in each of the development processes or a relationship with each of the documents can be issued. By doing this, a not-yet-associated document with which an Ingress relationship or an Egress relationship to be established has not been established, namely, a document that has no traceability from among documents managed in each of the development processes, can be specified accurately.

FIG. 3 illustrates an example of a hardware configuration of a computer implemented with the document management device 100. The computer illustrated in FIG. 3 includes a CPU 301, a memory 302, an input device 303, a display device 304, a storage 305, and a document registration interface (hereinafter referred to as a "document registration I/F") 306. The CPU 301, the memory 302, the input device 303, the display device 304, the storage 305, and the document registration I/F 306 may be connected to each other via a bus 307. The configuration illustrated in FIG. 3 is an example, and the document management device 100 having the functions illustrated in FIG. 1 may be implemented by a computer having another configuration.

The CPU 301 controls the entirety of a computer. The memory 302 is a memory such as a RAM that transitorily stores a program or data stored in the storage 305, for example, when a not-yet-associated document specifying program is executed, or when data is updated. The CPU 301 can implement the document management device 100 by loading a program into the memory 302 and executing the program.

The input device 303 enables a user to perform an operation to register, edit, or delete a development process such as the functional requirement process 201, the function design process 202, or the detailed design process 203 illustrated in FIG. 2. The input device 303 also enables a user to perform an operation to register, edit, or delete a document such as the functional requirement document, the function design document, or the detailed design document illustrated in FIG. 2 in each of the development processes. The input device 303 further enables a user to specify, for example, a retrieval condition to confirm a not-yet-associated document. Examples of the retrieval condition include the specification of a development process to be confirmed and the specification of a document to be confirmed.

The display device 304 is a display that displays information relating to an Ingress relationship and an Egress relationship between development processes or between documents that have been retrieved in response to the specification to retrieve a not-yet-associated document by a user, a retrieval result, error information indicating the not-yet-associated document, or the like.

The storage 305 corresponds to the storing unit 103 of FIG. 1, and is a storage that is configured, for example, of a hard disk storage or a semiconductor memory, and the storage 305 stores a not-yet-associated document specifying program, document data, and various management tables described later.

The document registration I/F 306 is an interface that registers documents in each of the development processes, for example, via a local area network (LAN) or the Internet.

Figure 5:
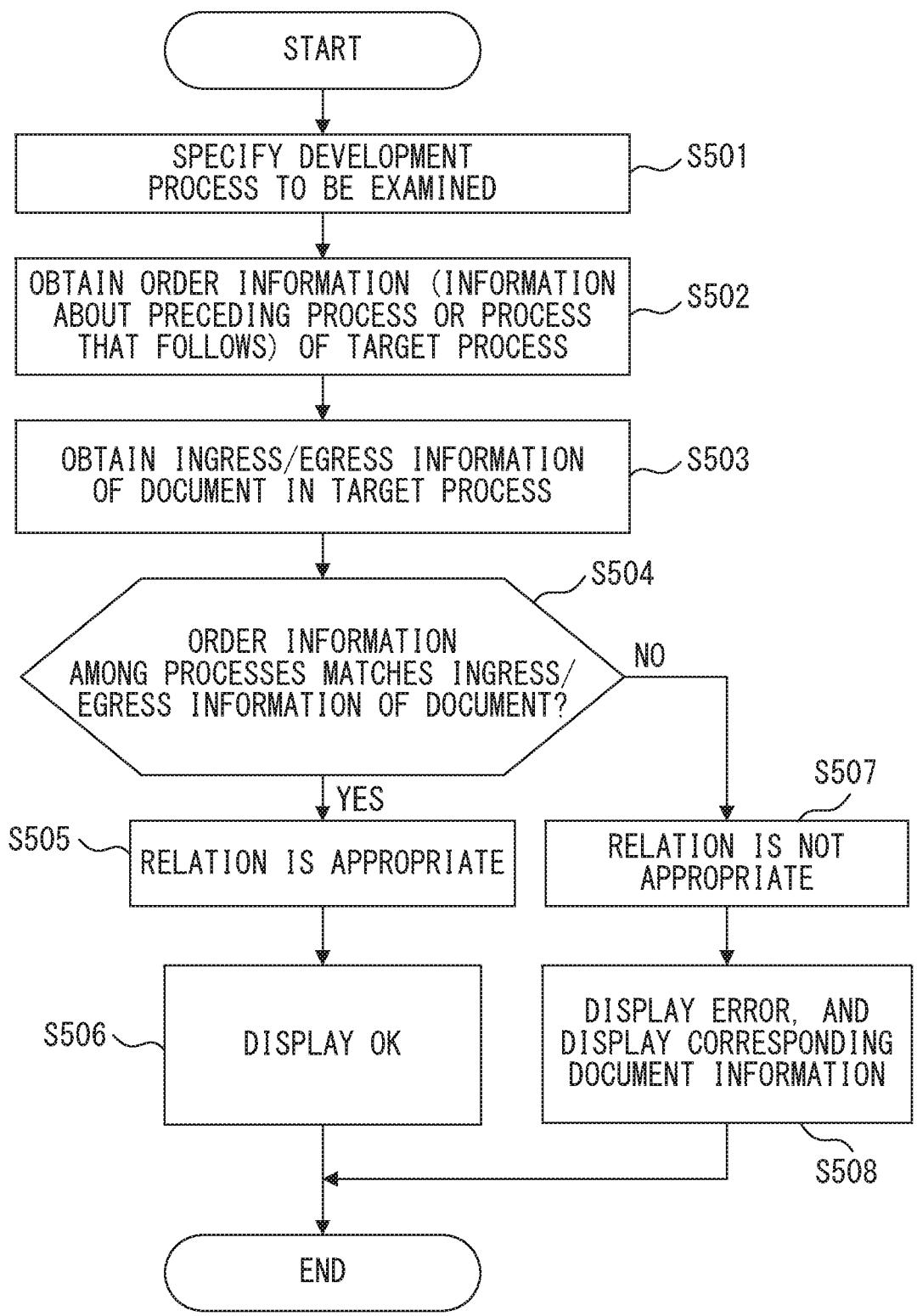
FIG. 5 is a flowchart illustrating an example of a document management process performed on a specified process.
Figure 7:
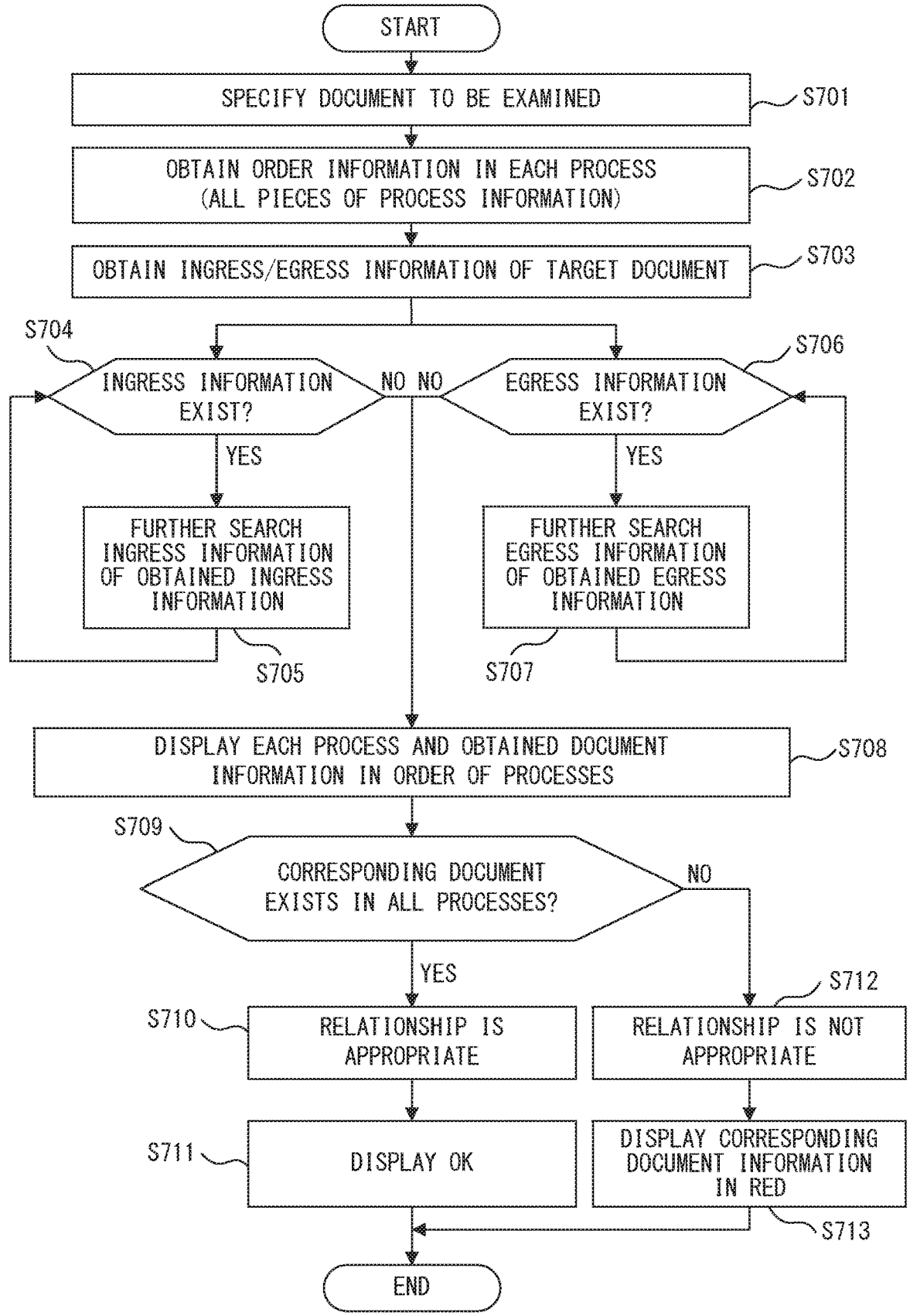
FIG. 7 is a flowchart illustrating an example of a document management process performed on a specified document.

A system according to the embodiments is implemented by the CPU 301 executing the not-yet-associated document specifying program installed with functions realized in the flowchart of FIG. 5 or 7, or the like. The program may be recorded and distributed, for example, in the storage 305 or a removable recording medium (not illustrated), or may be obtained via a network such as the LAN or the Internet by using a network connecting device (not illustrated).

FIG. 4A illustrates an example of a document management table. FIG. 4B illustrates an example of a relationship management table. The document management table and the relationship management table are stored, for example, in the storage 305 illustrated in FIG. 3.

In the document management table, an identifier (ID) to identify a document, a document name, and information relating to a registration process that is a development process that the document belongs to are registered in each record. In the relationship management table, information to identify a relationship is registered in each record. Specifically, master document information indicating a document on an upstream side of a relationship and slave document information indicating a document on a downstream side of the relationship are registered for each relationship. Stated another way, in the relationship management table, master document information to identify a document that has influence on a document that belongs to a development process on a downstream side and slave document information to identify a document that receives influence from a document that belongs to a development process on an upstream side are registered for each of the relationships indicating a relationship between documents.

The contents of the tables illustrated in FIGS. 4A and 4B represent the example illustrated in FIG. 2. As an example, the registered contents of the document management table indicate that the functional requirement documents, A, B, and C belong to the functional requirement process 201. The registered contents also indicate that the function design documents A1, A2, B, and C belong to the function design process 202. The registered contents further indicate that the detailed design documents A1, A2, B, C1, and C2 belong to the detailed design process 203.

A pair of documents that correspond to each of the relationships can be identified according to each item of the registered contents of the relationship management table and the document management table. As an example, the first record in the relationship management table illustrated in FIG. 4B indicates that a relationship (in FIG. 2, the relationship 204) has been established between the functional requirement document A identified by "ID 0001" and the function design document A identified by "ID 0004". Specifically, a document that receives influence from the functional requirement document A identified by "ID 0001" is the function design document A identified by "ID 0004". A document that has influence on the function design document A identified by "ID 0004" is the functional requirement document A identified by "ID 0001".

Alternatively, the last two records in the relationship management table indicate that the function design document C identified by "ID 0007" has respective relationships (in FIG. 2, the relationships 208 and 209) with the detailed design document C1 identified by "ID 0011" and the detailed design document C2 identified by "ID 0012". Specifically, documents that receive influence from the function design document C identified by "ID 0007" are the detailed design document C1 identified by "ID 0011" and the detailed design document C2 identified by "ID 0012". In addition, a document that has influence on each of the detailed design document C1 identified by "ID 0011" and the detailed design document C2 identified by "ID 0012" is the function design document C identified by "ID 0007".

FIG. 5 is a flowchart illustrating an example of a document management process performed on a specified process. This process is performed by the CPU 301 of FIG. 3 executing a not-yet-associated document program loaded from the storage 305 to the memory 302. In addition, this process is performed when a user specifies a development process in which a relation is to be confirmed by using the input device 303 of FIG. 3.

First, a user specifies a development process to be examined (hereinafter referred to as a "target process") by using the input device 303 (step S501).

Then, the not-yet-associated document specifying unit 101 obtains order information of the target process (step S502). Specifically, development processes on an upstream side and a downstream side of the target process are specified. In FIG. 2, for example, when a target process is the functional requirement process 201, the function design process 202 on the downstream side is specified. When a target process is the function design process 202, the functional requirement process 201 is specified as a development process on the upstream side, and the detailed design process 203 is specified as a development process on the downstream side. When a target process is the detailed design process 203, the function design process 202 on the upstream side is specified. Information indicating whether each of the development processes is upstream/downstream is stored, for example, in a table (not illustrated) on the storage 305. The information may be generated by sequentially searching processes registered in the document management table of FIG. 4A.

Then, the not-yet-associated document specifying unit 101 obtains information relating to an Ingress relationship and an Egress relationship with respect to a document that belongs to the target process specified in step S501 (step S503).

Specifically, the not-yet-associated document specifying unit 101 first obtains IDs of documents that belong to the target process from the document management table. As an example, when the target process is the function design process 202 of FIG. 2, the not-yet-associated document specifying unit 101 references the document management table illustrated in FIG. 4A so as to determine that IDs of documents that belong to the function design process 202 are "ID 0004", "ID 0005", "ID 0006", and "ID 0007". Stated another way, the function design documents A1, A2, B, and C are specified.

The not-yet-associated document specifying unit 101 then obtains information indicating Ingress relationships with respective documents identified by the specified IDs. Specifically, on the relationship management table illustrated in FIG. 4B, pieces of master document information are retrieved in records including these IDs as slave document information. As an example, a record in which "ID 0004" has been recorded as slave document information is the first record in the relationship management table illustrated in FIG. 4B. Here, master document information in the first record indicates "ID 0001" (the function design document A1). Namely, an Ingress relationship of "ID 0004" (the function design document A1) has been established with "ID 0001" (the functional requirement document A). This relationship is denoted by 204 in FIG. 2. "ID 0005" (the function design document A2) has not been registered as slave document information. An Ingress relationship of "ID 0006" (the function design document B) has been established with "ID 0002" (the functional requirement document B). This relationship is denoted by 206 in FIG. 2. An Ingress relationship of "ID 0007" (the function design document C) has been established with "ID 0003" (the functional requirement document C). This relationship is denoted by 207 in FIG. 2.

The not-yet-associated document specifying unit 101 then obtains information indicating Egress relationships with respective documents identified by the specified IDs ("ID 0004", "ID 0005", "ID 0006", and "ID 0007"). Specifically, on the relationship management table illustrated in FIG. 4B, IDs of pieces of slave document information in records including these IDs as master document information are retrieved. As an example, a record in which "ID 0004" has been registered as master document information is the fourth record in the relationship management table illustrated in FIG. 4B. Here, slave document information in the fourth record indicates "ID 0008" (the detailed design document A1). Namely, an Egress relationship of "ID 0004" (the function design document A1) has been established with "ID 0008" (the detailed design document A1). An Egress relationship of "ID 0005" (the function design document A2) has been established with "ID 0009" (the detailed design document A2). "ID 0006" (the function design document B) has not been registered as master document information. An Egress relationship of "ID 0007" (the function design document C) has been established with "ID 0011" (the detailed design document C1) and "ID 0012" (the detailed design document C2).

Following the process of step S503, the not-yet-associated document specifying unit 101 determines whether order information of the development processes that has been obtained in step S502 matches information relating to the Ingress relationships and the Egress relationships that has been obtained in step S503 (step S504).

When order information matches Ingress/Egress relationship information, the not-yet-associated document specifying unit 101 determines that an Ingress relationship and an Egress relationship with a target process are appropriate (step S505). Then, the not-yet-associated document information output unit 102 displays on the display device 304 that an examination result of the target process is "OK" (step S506). The document management process illustrated in FIG. 5 is finished.

When order information does not match Ingress/Egress relationship information, the not-yet-associated document specifying unit 101 determines that an Ingress relationship and/or an Egress relationship with a target process are not appropriate (step S507). In the example illustrated in FIG. 2, for example, it is detected that no Ingress relationships have been established with "ID 0005" (the function design document A2) in the function design process 202 that is a target process. It is also detected that no Egress relationships have been established with "ID 0006" (the function design document B). The not-yet-associated document information output unit 102 displays, on the display device 304, an Error message and information relating to a document in which abnormality has been detected (step S508). The document management process illustrated in FIG. 5 is finished.

FIG. 6 illustrates an example of not-yet-associated document information displayed according to the method illustrated in FIG. 5. This example indicates that an input document (an Ingress relationship) has not been established for the function design document A2. This example also indicates that an output document (an Egress relationship) has not been established for the function design document B.

As described above, as a result of the document management process illustrated in the flowchart of FIG. 5 in which a process is specified, a document that has no relationships (namely, a document that has no traceability) can be specified accurately and displayed in each of the development processes.

FIG. 7 is a flowchart illustrating an example of a document management process performed on a specified document. This process is performed by the CPU 301 of FIG. 3 executing a not-yet-associated document program loaded from the storage 305 to the memory 302. In addition, this process is performed when a user specifies a document with which a relationship is to be confirmed by using the input device 303 of FIG. 3.

First, a user specifies a document to be examined (hereinafter referred to as a "target document") by using the input device 303 (step S701).

Then, the not-yet-associated document specifying unit 101 obtains order information in all of the development processes (step S702). Specifically, as described above, information indicating whether each of the development processes is upstream/downstream is stored, for example, in a table (not illustrated) on the storage 305. This information may be generated by sequentially searching processes registered in the document management table of FIG. 4A.

The not-yet-associated document specifying unit 101 obtains information relating an Ingress relationship and an Egress relationship with respect to the target document (step S703). When a development process that the target document belongs to is the most upstream development process, only the information relating to the Egress relationship is obtained. When a development process that the target document belongs to is the most downstream development process, only the Ingress relationship is obtained. When a development process that the target document belongs to is neither the most upstream development process nor the most downstream development process, both the information relating to the Ingress relationship and the information relating to the Egress relationship are obtained, for example, in a parallel process (this may be a serial process).

Specifically, when the not-yet-associated document specifying unit 101 obtains the information relating to the Egress relationship, the not-yet-associated document specifying unit 101 references the document management table of FIG. 4A so as to obtain an ID of the target document. As an example, when the target document is the functional requirement document B (see FIG. 2), "ID 0002" is obtained. Then, the not-yet-associated document specifying unit 101 references the relationship management table of FIG. 4B so as to obtain slave document information in a record including the ID obtained from the document management table as master document information. Consequently, the information relating to the Egress relationship is obtained. As an example, for "ID 0002", "ID 0006" (the function design document B) is obtained.

When the not-yet-associated document specifying unit 101 obtains the information relating to the Ingress relationship, the not-yet-associated document specifying unit 101 first references the document management table of FIG. 4A so as to obtain an ID of the target document. As an example, when the target document is the detailed design document A2 (see FIG. 2), "ID 0009" is obtained. Then, the not-yet-associated document specifying unit 101 references the relationship management table of FIG. 4B so as to obtain master document information in a record including the ID obtained from the document management table as slave document information. Consequently, the information relating to the Ingress relationship is obtained. As an example, for "ID 0009", "ID 0005" (the function design document A2) is obtained.

When information relating to an Ingress relationship is searched in the process of step S703, the not-yet-associated document specifying unit 101 determines whether information relating to an Ingress relationship has been obtained (step S704). When information relating to an Egress relationship is searched in the process of step S703, the not-yet-associated document specifying unit 101 determines whether information relating to an Egress relationship has been obtained (step S706). When both information relating to an Ingress relationship and information relating to an Egress relationship are searched in the process of step S703, the determination processes of steps S704 and S706 are performed, for example, in parallel (these processes may be performed in series or the like).

When information relating to an Ingress relationship is obtained, the not-yet-associated document specifying unit 101 further searches information relating to an Ingress relationship with respect to a document indicated by the obtained information relating to the Ingress relationship (step S705). As an example, when "ID 0005" (the function design document A2) is obtained as information relating to an Ingress relationship for a target document identified by "ID 0009" (the detailed design document A2) (this relationship corresponds to 210 in FIG. 2), the following operation is performed. Namely, master document information in a record including "ID 0005" as slave document information is searched in the relationship management table of FIG. 4B. Consequently, information relating to a further Ingress relationship may be obtained. In this example, "ID 0005" has not been registered as slave document information in the relationship management table.

Then, the not-yet-associated document specifying unit 101 determines whether information relating to an Ingress relationship has been obtained in step S705 (step S704). When the determination in step S704 is YES, the process of step S705 is further performed, and preceding Ingress relationships are sequentially retrieved. For "ID 0005", the determination in step S704 is NO.

When information relating to an Egress relationship is obtained in step S703, and the determination in step S706 is YES, the not-yet-associated document specifying unit 101 further searches information relating to an Egress relationship with respect to a document indicated by the obtained information relating to the Egress relationship (step S707). As an example, when "ID 0006" (the function design document B) is obtained as information relating to an Egress relationship for a target document identified by "ID 0002" (the functional requirement document B) (this relationship corresponds to 206 in FIG. 2), the following operation is performed. Namely, slave document information in a record including "ID 0006" as master document information is searched in the relationship management table of FIG. 4B. Consequently, information relating to a further Egress relationship may be obtained. In this example, "ID 0006" has not been registered as master document information in the relationship management table.

Then, the not-yet-associated document specifying unit 101 determines whether information relating to an Egress relationship has been obtained in step S707 (step S706). When the determination in step S706 is YES, the process of step S707 is further performed, and following Egress relationships are sequentially retrieved. For "ID 0006", the determination in step S706 is NO.

When a target document is in an intermediate development process, and information relating to an Ingress relationship and information relating to an Egress relationship are retrieved in step S703, and the repetition process of steps S704-S705 and the repetition process of steps S706-S707 are performed in parallel.

When the determinations in steps S704 and S706 are NO, the not-yet-associated document information output unit 102 displays, on the display device 304, document information obtained as a result of a process of sequentially retrieving relationships (step S708). Pieces of information indicating respective documents are displayed in order of retrieval.

Further, the not-yet-associated document specifying unit 101 determines whether document information obtained as a result of a process of sequentially retrieving relationships exists in all of the development processes (step S709).

When the determination in step S709 is YES, it is determined that an Ingress relationship and an Egress relationship with respect to a target document are appropriate (step S710). Then, the display device 304 of FIG. 3 displays that an examination result of the target document is "OK" (step S711). The document management process illustrated in FIG. 7 is finished.

When the determination in step S709 is NO, it is determined that an Ingress relationship and/or an Egress relationship with respect to a target document are not appropriate (step S712). As an example, in the example illustrated in FIG. 2, when a target document is the detailed design document A2, it is detected that the function design document A2 does not have any Ingress relationships. In this case, information relating to a document that has abnormality is displayed, for example, in red as an error on a display screen of step S708 (step S713). The document management process illustrated in FIG. 7 is finished.

FIG. 8 illustrates an example of a display of the output of not-yet-associated document information displayed on the display device 304 in steps S708 and S713 according to the method illustrated in FIG. 7. In this example, a development process and a test process further exit on a downstream side of the detailed design process 203 of FIG. 2. When a target document is the detailed design document A2, a document on a downstream side of the target document is OK, but the function design document A2 does not have an Ingress relationship on an upstream side of the target document (see FIG. 2). Accordingly, an area that corresponds to the functional requirement process 201 is displayed in red (the area is illustrated with hatching in FIG. 8). A message indicating that an output according to a function requirement has not been registered is also displayed.

As described above, as a result of the document management process illustrated in the flowchart of FIG. 7 in which a document is specified, whether traceability exists over all of the development processes can be accurately specified and displayed for each of the documents.

As described above, in the document management method according to the embodiments, a document that does not have traceability from among documents managed in each of the development processes can be specified.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a document management process, the document management process comprising:

referencing a storage apparatus that stores a plurality of documents in each of a plurality of development processes;

identifying a specified document with which at least one of a first association, a second association and a third association has not been performed among the plurality of documents;

causing a user to identify the specified document for which at least one of the first association, the second association, and the third association is to be confirmed;

sequentially retrieving, from the specified document, a document with which at least one of the first association, the second association, and the third association has been performed in an upstream direction and a downstream direction of the development process to which the specified document belongs; and specifying the development process in which at least one of the first association, the second association and the third association has not been established; and outputting information relating to the specified document, wherein the identifying includes specifying a first document with which the first association has not been performed, the first document being stored in the storage apparatus and belonging to a most downstream development process in the plurality of development processes and the first association indicating that the first document is changed according to change in another document that belongs to an upstream development process, and specifying a second document with which neither the second association nor the third association has been performed, the second document being stored in the storage apparatus and belonging to a development process that is neither a most upstream development process nor the most downstream development process in the plurality of development processes, the second association indicating that when the second document is changed, a downstream document that belongs to a downstream development process is changed according to change in the second document, and the third association indicating that when an upstream document that belongs to the upstream development process is changed, the second document is changed according to change in the upstream document.

2. The non-transitory computer-readable recording medium according to claim 1, the process further comprising:

causing a user to identify a specified development process for which at least one of the first association, the second association, and the third association is to be confirmed; and specifying, among the plurality of documents which are stored in the storage apparatus and belonging to the specified development process, the first document and the second document when one or more development processes exist on an upstream side of the specified development process, and specifying the second document when one or more development processes exist on a downstream side of the specified development process.

3. The non-transitory computer-readable recording medium according to claim 1, the process further comprising:

generating a document management table that stores information to identify the development process;

generating a relationship management table that stores master document information to identify a document that has influence on a document that belongs to the downstream development process and slave document information to identify a document that receives influence from a document that belongs to the upstream development process; and referencing the document management table and the relationship management table so as to specify one of the first document and the second document.

4. A document management device comprising:

a storage configured to store a plurality of documents in each of a plurality of development processes; and a processor configured to perform a document management process comprising:

identifying a specified document with which at least one of a first association, a second association and a third association has not been performed among the plurality of documents;

causing a user to identify the specified document for which at least one of the first association, the second association, and the third association is to be confirmed;

sequentially retrieving, from the specified document, a document with which at least one of the first association, the second association, and the third association has been performed in an upstream direction and a downstream direction of the development process to which the specified document belongs; and specifying the development process in which at least one of the first association, the second association and the third association has not been established; and outputting information relating to the specified document, wherein the identifying includes specifying a first document with which the first association has not been performed, the first document being stored in the storage apparatus and belonging to a most downstream development process in the plurality of development processes and the first association indicating that the first document is changed according to change in another document that belongs to a downstream development process, and specifying a second document with which neither the second association nor the third association has not been performed, the second document being stored in the storage apparatus and belonging to a development process that is neither a most upstream development process nor the most downstream development process in the plurality of development processes, the second association indicating that when the second document is changed, a downstream document that belongs to a downstream development process is changed according to change in the second document, and the third association indicating that when an upstream document that belongs to the upstream development process is changed, the second document is changed according to change in the upstream document.

5. A document management method by using a computer, the method comprising:

referencing a storage apparatus that stores a plurality of documents in each of a plurality of development processes;

identifying a specified document with which at least one of a first association, a second association and a third association has not been performed among the plurality of documents;

causing a user to identify the specified document for which at least one of the first association, the second association, and the third association is to be confirmed;

sequentially retrieving, from the specified document, a document with which at least one of the first association, the second association, and the third association has been performed in an upstream direction and a downstream direction of the development process to which the specified document belongs; and specifying the development process in which at least one of the first association, the second association and the third association has not been established; and outputting information relating to the specified document, wherein the identifying includes specifying a first document with which the first association has not been performed, the first document being stored in the storage apparatus and belonging to a most downstream development process in the plurality of development processes and the first association indicating that the first document is changed according to change in another document that belongs to an upstream development process, and specifying a second document with which neither the second association nor the third association has not been performed, the second document being stored in the storage apparatus and belonging to a development process that is neither a most upstream development process nor the most downstream development process in the plurality of development processes, the second association indicating that when the second document is changed, a downstream document that belongs to a downstream development process is changed according to change in the second document, and the third association indicating that when an upstream document that belongs to the upstream development process is changed, the second document is changed according to change in the upstream document.

* * * * *